United States Patent [19]

Gupta et al.

[11] Patent Number: 4,869,197
[45] Date of Patent: Sep. 26, 1989

[54] BULGE INDICATING METHOD AND DEVICE

[76] Inventors: Bal K. Gupta, 45 Rossburn Drive, Etobicoke, Ontario. M9C 2P9; David L. Mader, 1294 Islington Ave., Apartment #704, Islington, Ontario. M9A 3K2, both of Canada

[21] Appl. No.: 159,334

[22] Filed: Feb. 23, 1988

[51] Int. Cl.⁴ .............................................. G08B 5/00
[52] U.S. Cl. ..................................... 116/266; 73/731; 116/212; 116/215
[58] Field of Search ................. 73/762, 731, 787, 827, 73/830; 116/DIG. 34, 200, 201, 203, 208, 212, 215, 266

[56] References Cited

U.S. PATENT DOCUMENTS

| | | | |
|---|---|---|---|
| 2,726,625 | 12/1955 | Evans | 116/203 |
| 3,185,905 | 5/1965 | Sternbeck | 317/256 |
| 3,546,944 | 12/1970 | Mack | 116/266 |
| 3,844,248 | 10/1974 | Parker | 116/212 |
| 3,896,758 | 7/1975 | Di Battista | 116/201 |
| 3,976,381 | 8/1976 | Walker et al. | 73/762 |
| 3,979,949 | 9/1976 | Smith | 73/762 |
| 4,409,841 | 10/1983 | Archer | 73/762 |
| 4,685,337 | 8/1987 | Church | 73/762 |
| 4,722,451 | 2/1988 | Conrad | 215/365 |

Primary Examiner—William A. Cuchlinski, Jr.
Assistant Examiner—W. Morris Worth
Attorney, Agent, or Firm—Ridout & Maybee

[57] ABSTRACT

A method and device for indicating the swelling of a casing or the like having a wall with at least one generally planar portion prone to deformation by pressure buildup within the casing. The device comprises an elongate strip of visible frangible material adapted for spanning superposition with the planar portion of the wall and means for securing opposing ends of the frangible strip to the casing to restrict movement of the ends perpendicular to the planar portion of the wall. Increasing bulging of the wall deflects the frangible strip to the point of fracture thereof. In another embodiment, gaskets may be interposed between the ends of the frangible strip and the wall of the casing to provide a clearance therebetween, thus increasing the permissible degree of bulging of the wall which may occur before deflection of the frangible strip. The method comprises superposing the device in spanning relation with a planar portion of a wall of the casing and securing opposing ends of the frangible strip to the casing to restrict movement thereof perpendicular to the planar portion of the wall.

18 Claims, 1 Drawing Sheet

BULGE INDICATING METHOD AND DEVICE

FIELD OF THE INVENTION

The present invention relates to a device for visually indicating the swelling of a casing or the like due to pressure buildup within the casing beyond a selected limit. More particularly, this invention relates to an indicating strip for indicating the swelling of a capacitor casing or the like in a high voltage power distribution system.

BACKGROUND OF THE INVENTION

A common problem encountered in connection with power capacitors using dielectric oil containing PCB (polychlorinated biphenyl) compounds is bursting or rupture of the capacitor casing, particularly in the case of older capacitors utilizing paper insulation. Paper insulation can degrade gradually over an extended period, and gas evolved from decomposition of the paper and the dielectric oil can cause a dangerous pressure build-up within the capacitor casing. This can lead to swelling and ultimately rupture of the capacitor casing, resulting in power interruptions and requiring expensive cleanup measures.

Typically, such a capacitor is protected from bursting due to current overload by a fuse which blows at a high fault current. However, the build-up of pressure from paper degradation can result in rupture of the capacitor casing even in the absence of a current high enough to blow the fuse.

Pressure actuated switches are known to be used in induction heating devices, whereby a build-up of pressure over a selected limit will actuate the pressure actuated switch which in turn activates a disconnect relay to deactivate the device. Such a mechanism is relatively complex, and must be installed inside the device in order to be effective. Moreover, where the pressure buildup occurs from decomposition, merely deactivating the device will not prevent further buildup of pressure. In such a case indicating means is necessary to identify the problem before rupture of the device.

SUMMARY OF THE INVENTION

The present invention provides a simple and inexpensive method and device for monitoring pressure buildup and visually indicating pressure overload in a capacitor casing or the like. The device is installed on the exterior of the casing, and thus may be easily installed on capacitors which were not originally constructed with a pressure overload indicating or failsafe feature. The device also permits easy replacement in the event that the capacitor is not beyond salvage.

In particular, the present invention provides a method of monitoring pressure buildup within a casing or the like having a wall which provides a deformable portion prone to bulging due to pressure buildup within the casing. The method comprises an elongate superposing strip of, frangible material in spanning relation with the deformable portion of the wall at a position at which it can be readily observed, and hingedly securing opposing ends of the frangible strip to the casing to restrict movement thereof perpendicular to the planar portion of the wall, the strip remaining in a position at which increasing bulging of the deformable portion of the wall abutting against the strip deflects the frangible strip to the point of fracture thereof. When the strip fractures, at least one portion of the fractured strip will fall away from the wall while remaining hingedly secured to the casing at one end, thus providing a visual indication of pressure buildup beyond the selected limit.

Additionally, the present invention provides a device for indicating the swelling of a casing or the like having a wall with at least one generally planar portion prone to deformation by pressure buildup within the casing. The device comprises an elongate strip of visible frangible material adapted for spanning superposition with the planar portion of the wall, and means for securing opposing ends of the frangible strip to the casing to restrict movement of the ends perpendicular to the planar portion of the wall, whereby increasing bulging of the wall deflects the frangible strip to the point of fracture thereof, causing a portion of the fractured strip to swing away from the wall and so provide a visual indication of pressure buildup beyond the selected limit.

BRIEF DESCRIPTION OF THE DRAWINGS

In drawings which illustrate by way of example only embodiments of the present invention.

DETAILED DESCRIPTION OF THE INVENTION

Figure 1:
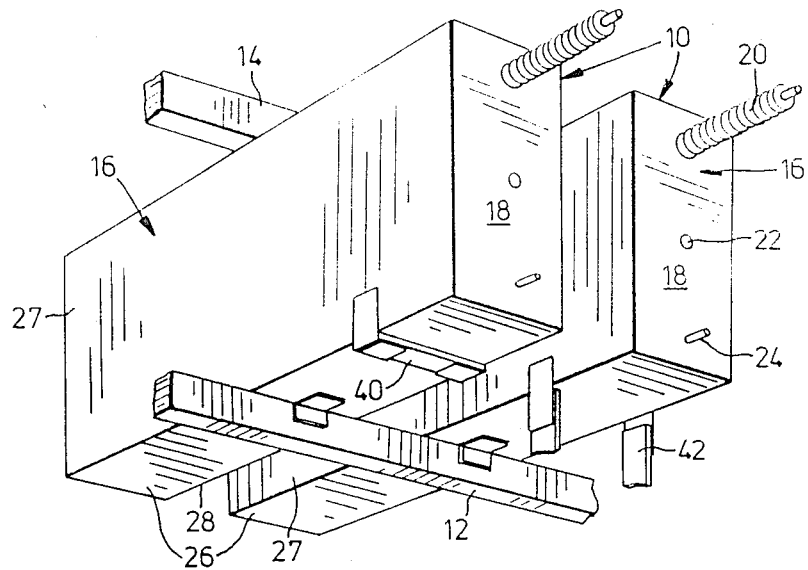
FIG. 1 is a perspective view of two capacitors mounted in a capacitor bank illustrating an embodiment of the present invention.

Referring to FIG. 1, capacitors 10 are mounted in a capacitor bank supported by support beams 12, 14. Each capacitor 10 includes a casing 16 having generally planar walls prone to deformation by pressure buildup within the casing. The front end wall 18 presents a bushing 20 and ground connector 24, with a filling hole 22 disposed therebetween.

In a preferred embodiment of the invention, a strip of frangible material 30, such as glass, has a length adapted to span a planar portion of a wall of the casing 16. In FIG. 1 the frangible strip 30 is illustrated superposed with the bottom wall 26 of the casing 16 transversely, although the frangible strip 30 may be oriented longitudinally or diagonally, if desired, and may be superposed with any generally planar portion of a wall of the casing 16.

The frangible strip 30 may be of any convenient width, preferably 10 to 100 millimeters for the application illustrated. The preferred thickness of the frangible strip 30 will depend upon its length and width and a selected permissible limit of bulging of the wall 26, as explained in more detail below.

The frangible strip 30 is secured at its ends 32, 34 to the casing 16 so as to restrict movement of the ends 32, 34 of the frangible strip 30 perpendicular to the wall 26. In the embodiment illustrated this is accomplished by affixing securing means 36 to the ends 32, 34 of the frangible strip 30 and the side walls 27, 28 of the casing 16. In this manner the ends 32, 34 of the frangible strip 30 are restricted from movement perpendicular to the wall 26, since swelling of the casing 16 will cause the side walls 27, 28 to bulge laterally but will not deform them transversely. It is important that at least a portion of the frangible strip 30 remains exposed, in order to permit fracture of the frangible strip 30 without interference by the securing means 36.

Securing means 36 preferably comprises pressure sensitive adhesive tape capable of strong adhesion to the casing 16 and able to withstand environmental factors. The adhesive tape serves two functions. First, it secures the ends 32, 34 of the frangible strip 30 to the casing 16, and second, by virtue of its pliability, it enables the remaining portions of the frangible strip 30 after fracture thereof to assume an orientation visibly different from the orientation of the frangible strip 30 in the intact state. This allows for easy visual monitoring of the indicator.

In operation, the indicator is secured to the casing 16 as described above. Preferably the frangible strip 30 is superposed with a wall of the casing 16 which is easily visible from the ground or other monitoring site, such as the front wall 18 or bottom wall 26. An additional advantage to superposing the frangible strip 30 with the bottom wall 26 is that upon fracture of the frangible strip 30 the remaining portions 30a, 30b thereof will swing downwardly, still suspended by the pliable securing means 36. In this manner the surface 42 of the frangible strip 30 abutting the casing 16 is displaced for easy visual monitoring, as illustrated in FIG. 1.

Figure 2:
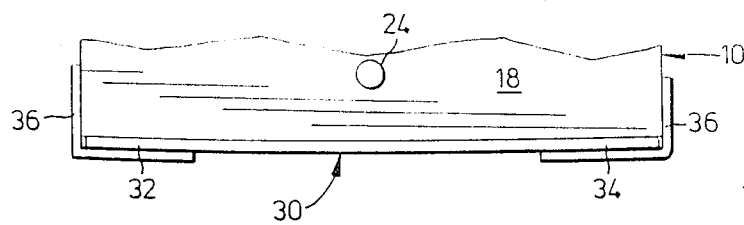
FIG. 2 is a partial end elevation of a capacitor illustrating the embodiment of the invention illustrated in FIG. 1 in an intact state.
Figure 3:
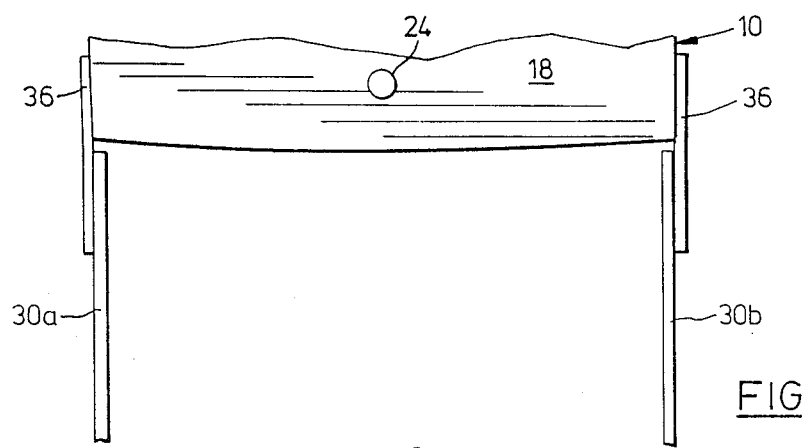
FIG. 3 is a partial end elevation of the capacitor of FIG. 2 illustrating the embodiment of the invention in a fractured state.

As gases build up within the casing 16 and the pressure therein increases, the casing swells and the walls of the casing, including the bottom wall 26, bulge outwardly. Bulging of the wall 26 causes the deformable wall portion to abut and bear against the strip 30 at a position between its ends. With increasing pressure buildup the strip is thereby subjected to increasing bending stress and thereby deflected to its point of fracture illustrated in FIG. 2. Because the strip 30 is composed of a frangible material, only a certain amount of deflection will be tolerated before the frangible strip 30 fractures to provide a visual indication that swelling of the casing 16 has occured due to pressure buildup beyond the permissible limit. This visual indication as illustrated in FIG. 3, is represented by at least a portion of the fractured strip having fallen away from the wall while remaining hingedly secured to the casing at one end.

The thickness of the frangible strip 30 is important to the proper operation of the indicator. It is largely the thickness of the frangible strip 30 relative to its length which determines the amount of deflection at which the frangible strip 30 will fracture, a thinner strip being more flexible and therefore permitting greater deflection before fracture than a thicker strip.

However, a thick strip of frangible material such as glass can be so rigid and strong that the adhesive tape 36 used to secure the ends 32, 34 of the frangible strip 30 to the casing 16 may stretch or break or the adhesive may creep before the frangible strip 30 fractures. It has been found that an upper limit for the thickness of the frangible strip 30, composed of glass, is approximately 3 millimeters for a length of 140 mm where fabric tape fasteners are employed as securing means 36.

As an example, it has been found that a frangible strip 30, composed of typical window glass with a strength of 25 to 50MPa, having a width between 10 and 100 millimeters, should be between 1 and 2 millimeters thick in order to fracture at a deflection of 2 millimeters across a span of 140 millimeters. Thus a strip of typical window glass with a thickness of 1.5 millimeters should fracture when the pressure reaches approximately 90 kPa in the capacitor illustrated. Capacitor casings will typically rupture at 200 to 400 kPa.

Allowance should be made for a permissible degree of swelling of the casing 16 due to such factors as change in temperature. Thus, the thickness of the frangible strip 30 should be selected to account for these factors to permit deflection without fracture to a permissible degree of bulging of the wall 26, which can be determined by experimentation.

Figure 4:
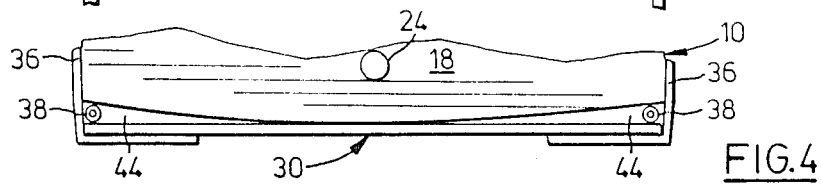
FIG. 4 is a partial end elevation of a capacitor illustrating another embodiment of the invention.

In another embodiment of the invention, illustrated in FIG. 4, it may be desirable to interpose gaskets 38 between the ends 32, 34 of the frangible strip 30 and the wall 26 of the casing 16. This will increase the permissible degree of bulging of the wall 26 which may occur before deflection of the frangible strip 30 to the point of fracture by providing a clearance 44 between the frangible strip 30 and the wall 26. This embodiment is also particularly useful where the portion of the wall with which the indicator is to be superposed is not perfectly planar, either by design or due to swelling of the casing 16 which may have occurred prior to the installation of the indicator.

For easy visual monitoring of the indicator, it is preferable that the surface 40 of the frangible strip 30 be coloured to match or blend with the colour of the casing 16, and that the surface 42 of the frangible strip 30 abutting the casing 16 be coloured to contrast as sharply as possible with the colour of the casing 16. This will enable service personnel to more easily identify a frangible strip 30 which has fractured, and attend to repair or replacement of the capacitor.

The frangible strip 30 may be scored transversely around the midpoint of its length, in order to promote a clean fracture, thus preventing shards of the frangible material from falling to the ground upon fracture of the frangible strip 30. Scoring the frangible strip 30 in this manner may reduce the amount of deflection that the frangible strip 30 will tolerate before fracturing, and this should be considered in selecting the thickness of the frangible strip 30 having regard to the permissible limit of bulging which is determined to be appropriate for a particular application.

The indicator of the present invention has been described by way of example superposed with the bottom wall 26 of the casing 16 of a capacitor 10. However, the indicator may be superposed with a generally planar portion of any wall of the casing 16, having regard to the advantages of visibility and altered orientation of the indicator when fractured, discussed above, as well as limits which may be imposed by structures presented on the casing 16 such as the bushing 20, ground connector 22 and filling hole 24.

Additionally, the indicator has been described in connection with its application to a capacitor 10 of the type illustrated and described. The indicator may, however, be utilized in connection with any casing or the like prone to swelling and having a wall with a generally planar portion, with modifications that will be obvious to a person having ordinary skill in the art having regard to the above description. Thus, this description is a non-limiting example only of a preferred embodiment of the invention.

We claim:

1. A method of monitoring pressure buildup within a casing having at least one wall which provides a deformable portion prone to bulging due to pressure buildup, which method comprises:

superposing an elongate rigid strip of frangible material in spanning relation with said deformable wall portion at a position at which it can be readily observed, hingedly securing opposing ends of the strip to the casing, the strip remaining in a position at which increasing bulging of said deformable wall portion will cause said deformable wall portion to abut and bear against the strip with increasing force and deflect the strip to its point of fracture, thereby permitting a portion of the fractured strip to fall under the influence of gravity away from said wall portion while remaining secured to the casing at one end, and so providing a visual indication of pressure buildup beyond a selected limit, and observing the position of the strip.

2. A method as defined in claim 1 including interposing gaskets between the ends of the frangible strip and the wall to maintain the frangible strip in spaced relation from the wall.

3. A method as defined in claim 1 wherein the opposing ends of the strip are hingedly secured to the casing with pliable securing means.

4. A method as defined in claim 3 wherein the pliable securing means comprises adhesive tape.

5. A method as defined in claim 1 wherein the frangible material is glass.

6. A method as defined in claims 3, 4 or 5, wherein a surface of the frangible strip facing the wall is coloured to contrast with the colour of the wall to enhance visual detection of the strip when fractured.

7. A method as defined in claim 5 wherein the frangible strip is scored transversely at a middle portion thereof.

8. In combination with a casing having at least one wall which provides a deformable portion prone to bulging due to pressure buildup within the casing, means for monitoring the pressure buildup comprising:

an elongate rigid strip of frangible material superposed in spanning relation with said deformable portion of the wall at a position at which it is readily observable, and pliable securing means hingedly securing opposing ends of the strip to the casing, the strip being positioned in relation to the casing such that increasing bulging of said deformable wall portion will cause the wall portion to abut and bear against the strip with increasing force and deflect the strip to its point of fracture, thereby permitting a portion of the fractured strip to fall under the influence of gravity away from the wall while remaining secured to the casing at one end, and so provide a visual indication of pressure buildup beyond a selected limit.

9. The combination claimed in claim 8 including gaskets interposed between the ends of the frangible strip and the the wall thereby providing a clearance between the strip and the deformable wall portion to permit a selected degree of bulging of the deformable wall portion before the frangible strip is deflected thereby.

10. The combination claimed in claim 8 wherein the securing means includes adhesive tape.

11. The combination claimed in claim 8 wherein the frangible material is glass.

12. The combination as claimed in claim 11 wherein the frangible strip is scored transversely at a middle portion thereof.

13. The combination claimed in claims 10 or 12 wherein a surface of the frangible strip facing the wall is coloured to contrast with the colour of the wall to enhance visual detection of the strip when fractured.

14. A device for visually indicating pressure buildup beyond a selected limit in a casing having at least one wall providing a deformable portion which is prone to bulging due to pressure buildup, comprising an elongate rigid strip of frangible material adapted for spanning the deformable wall portion of the casing, said strip being scored transversely at a middle portion thereof, and pliable securing means for securing opposing ends of the frangible strip to the casing to restrict movement of the ends in a direction perpendicular to said deformable wall portion, a surface of said middle portion of the strip abutting said deformable wall portion to be deflected thereby to its point of fracture in response to bulging of the deformable wall portion due to pressure buildup to the selected limit, whereby a portion of the strip will fall under the influence of gravity away from the wall while remaining hingedly secured to the casing at one end and so provide a visual indication of pressure buildup beyond the selected limit.

15. An indicator as defined in claim 14 including gaskets interposed between the ends of the frangible strip and the wall to provide a clearance between the strip and said deformable wall portion.

16. An indicator as defined in claim 14 wherein the securing means is adhesive tape.

17. An indicator as defined in claim 14 wherein the frangible material is glass.

18. An indicator as defined in claim 14 wherein a surface of the frangible strip facing the wall is coloured to contrast with the colour of the wall to enhance visual detection of the strip when fractured.

* * * * *